United States Patent [19]

Goel

[11] Patent Number: 4,661,583

[45] Date of Patent: Apr. 28, 1987

[54] REACTION OF BICYCLIC AMIDE ACETAL WITH IMIDE

[75] Inventor: Anil B. Goel, Worthington, Ohio

[73] Assignee: Ashland Oil, Inc., Ashland, Ky.

[21] Appl. No.: 747,737

[22] Filed: Jun. 24, 1985

[51] Int. Cl.$^4$ .............................................. C08G 73/00
[52] U.S. Cl. .................................... 528/322; 525/55; 525/326.7; 525/374; 526/259; 526/260; 526/262; 528/170; 548/217; 548/218; 548/219
[58] Field of Search ...................... 548/217, 218, 219; 528/322, 170; 526/259, 262, 260; 525/55, 326.7, 374

[56] References Cited

U.S. PATENT DOCUMENTS 4,539,376  9/1985  Goel et al. ........................ 525/375

Primary Examiner—Harold D. Anderson
Attorney, Agent, or Firm—John F. Jones

[57] ABSTRACT

The process for preparing novel monomers and polymers by reaction of a bicyclic amide acetal with an imide compound at a temperature in the range of from about 0° C. to 250° C. is disclosed.

12 Claims, No Drawings

REACTION OF BICYCLIC AMIDE ACETAL WITH IMIDE

This invention relates to a process for preparing novel monomeric and polymeric products by the reaction of bicyclic amide acetals with imides and more particularly relates to the production of novel monomers and polymers by the interaction of bicyclic amide acetals with either saturated or unsaturated imides.

I have discovered that bicyclic amide acetals undergo ring opening reactions with the imidic proton of unsubstituted imides to give the monomeric or polymeric products. The double bond of unsaturated imides (e.g. maleimide) also participates in the reaction when olefinically unsaturated imides are employed in this process giving insoluble (probably cross-linked) polymers.

Bicyclic amide acetals and some of their reactions have been described as in SYNTHESIS, P. 16–26, (1971). No report of the reaction of bicyclic amide acetals with imides appears in the literature.

The monomers and polymers produced in the process of this invention are useful in the production of polyurethanes and in the formation of composites in reaction injection molding (RIM) applications.

The bicyclic amide acetals useful in this invention include any of these of the following Formulas (I, II or III,

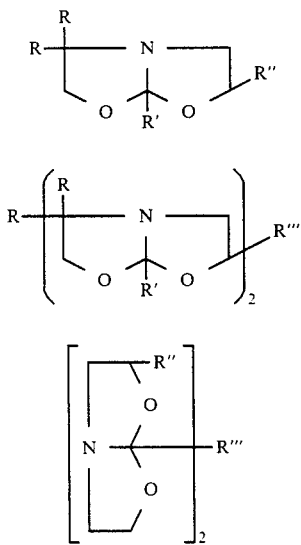

wherein R, R' and R" independently represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 18 carbon atoms and R''' represents an alkylene group having from 1 to 20 carbon atoms or an arylene group having from 6 to 12 carbon atoms.

The imide compounds useful in this invention include maleimide, N-alkyl maleimides, N-aryl maleimides, N,N'-alkylene bis maleimides, N,N'-arylene bis maleimides, homopolymers and copolymers of maleimides and substituted maleimides, succinimide, alkyl and aryl succinimides with substitutions in the 3 and/or 4 position, pyromellitic diimide, and the like. The process of this invention can be illustrated in the reaction between succinimide and a bicyclic amide acetal of Formula I to form a hydroxy alkyl amide imide as the major compound as shown below:

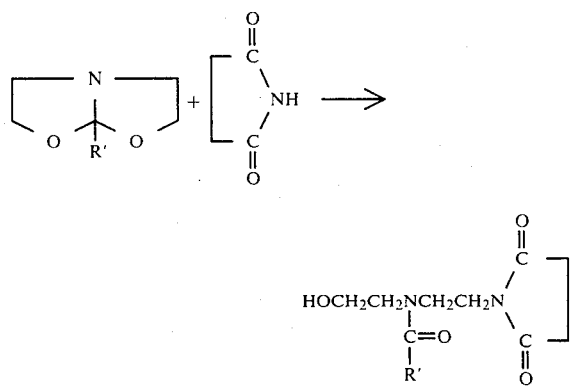

wherein R' has the foregoing designation.

Similarly a bis-bicyclic amide amide acetal of Formula II or III will react with a diimide to give a polymeric material. Interestingly, unsaturated imide compounds, for instance maleimide, react exceedingly rapidly and exothermically with mono and bis-bicyclic amide acetals to give solid polymeric products which have been found to be insoluble in most common solvents indicating as possible cross-linked structure. Although no definite structure can be assigned to these compounds, it is believed that both the imidic N-H proton and the unsaturation participate in the reaction and that bicyclic amide acetals undergo a ring opening reaction in such a case.

The process of this invention can be carried out at a temperature in the range of from 0° C. to 250° C. either in the presence or absence of a solvent or diluent, solvents and diluents which may be used include aliphatic and aromatic hydrocarbons, linear and cyclic ethers, ketones (e.g. acetone), alcohols, halogenated hydrocarbons, dimethyl formamide, N-methyl pyrrolidone, and the like. The equivalent ratio of bicyclic amide acetal to imide is preferably in the range of from 0.8:1 to 1:1.2. The use of small amounts of bicyclic amide acetal to cross-link or modify imide containing polymers is within the scope of the present invention.

The inclusion of fillers, other monomers such as oxazolines and epoxides, and polymers such as epoxy resins in the process of this invention is contemplated.

The process and products of this invention are further illustrated in the following representative examples.

EXAMPLE 1

A bicyclic amide acetal of Formula I in which R and R" are hydrogen and R' is methyl (1.32 g) and maleimide (0.98 g) were mixed at room temperature. An exothermic reaction within 15 minutes to give a dark red solid material which was found to be only partially soluble in solvents such as dimethyl formamide (DMF) and 1-methyl-2-pyroliidinone (NMP) and insoluble in toluene and acetone. The infrared spectrum of the solid showed bands for the hydroxyl group and amide group at 3300–3350 cm-1 and 1620 cm-1, respectively, indicating the ring opening of the bicyclic amide acetal.

EXAMPLE 2

The bicyclic amide acetal of Example 1 (1.33 g) and 1.01 g of succinimide were mixed and heated at 100–110 degrees C. for 1 hour. The infrared spectrum of the resulting solid showed strong bands at 3300–3350 cm-1 (hydroxyl group), 1610–1620 cm-1 (amide group) and 1700 cm-1 (imide group).

EXAMPLE 3

The procedure of Example 1 was followed using 2.13 g of a bicyclic amide acetal of Formula I in which R is hydrogen, R' is ethyl and R" is $CH_2OCH_2CH=CH_2$ and 0.98 g of maleimide. The solid polymeric material obtained upon heating the reaction mixture at about 100 degrees C. for 30 minutes was found to be insoluble in toluene and acetone. The infrared spectrum for this material showed bands at 3300 cm-1 (hydroxyl), 1610–20 cm-1 (amide group) and 1700–1710 cm-1 (imide group).

EXAMPLE 4

A bis-bicyclic amide acetal of Formula II wherein R is hydrogen, R' is ethyl and R''' is $C_4H_8$ (3.40 g) and maleimide (1.95 g) were mixed at room temperature and heated at about 100 degrees C. for one hour to give a solid polymeric material which was found to be insoluble in most common organic solvents including acetone, tetrahydrofuran, dimethyl formamide and NMP. The solid did not melt when heated up to 200 degrees C.

EXAMPLE 5

The bicyclic amide acetal described in Example 1 (1.31 g) and N-phenyl maleimide (1.75 g) were mixed at room temperature. An exothermic reaction occurred within 15 minutes to give a viscous paste (orange color). This material was heated at 100 degrees C. for 2 hours. The resulting red colored pasty material showed a strong band for the imide group at 1700 cm-1. GLC analysis showed the disappearance of starting materials at this point. The product was soluble in solvents such as chloroform and acetone.

EXAMPLE 6

A bicyclic amide acetal of Formula I wherein R is methyl, R' is $C_7H_{15}$ and R" is $CH_2OCH_2CH=CH_2$ (3.15 g) and 0.98 g of maleimide were mixed and heated at 100 degrees C. for 2 hours. The solid material which resulted showed infrared bands at 3200 cm-1 (NH), and 1760 cm-1 (ester group) indicating the ring opening of the bicyclic amide acetal. The imide group showed a strong band at 1700 cm-1.

EXAMPLE 7

The bicyclic amid acetal of Example 1 (1.36 g) and 1.81 g of a bis-maleimide (4,4'methylene bis(N-phenyl maleimide)) were mixed and heated at 120 degrees C. for 30 minutes to give a brick-red colored solid material which was soluble in dimethyl formamide and NMP.

EXAMPLE 8

A bicyclic amid acetal of Formula I wherein R and R" are hydrogen and R' is phenyl (0.96 g) and 0.48 g of maleimide were mixed and heated at 100 degrees C. for 1 hour to give a deep red colored solid. The infrared spectrum for this material showed the presence of bands for the hydroxyl group (3400 cm-1), amide group (1620 cm-1) and imide group (1710 cm-1). The solid product was soluble in dimethyl formamide and NMP.

EXAMPLE 9

A bis-bicyclic amide acetal of Formula II wherein R is hydrogen, R' is ethyl and R''' is $CH_8$ (1.8 g) and pyromellitic diimide (1.10 g) were mixed and heated at 180° C. for two hours to give a polymeric material. An adhesive bond was prepared by placing a small piece of this polymeric material between two 1"×4" steel plates with 1" overlap and melting the polymeric material at about 210° C. The resulting adhesive bond was found to have a room temperature shear strength of about 850 psi.

I claim:

1. The process for preparing a polymer composition comprising reacting a mixture of a bicyclic amide acetal and an imide which is a maleimide compound at a temperature in the range of from about 0° C. to 250° C. wherein the bicyclic amide acetal is one having the formula I, II or III

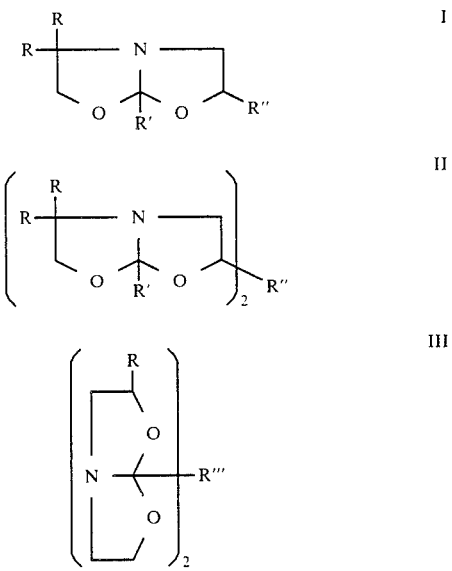

wherein R, R' and R" independently represent hydrogen, an alkyl group having from 1 to 20 carbon atoms, an aryl group having from 6 to 12 carbon atoms, an alkaryl group having from 7 to 20 carbon atoms, an alkyl ether group having from 1 to 20 carbon atoms or an aryl ether group having from 6 to 18 carbon atoms and R''' represents an alkylene group having from 1 to 20 carbon atoms, or an arylene group having from 6 to 12 carbon atoms.

2. The process of claim 1 wherein the imide compound is selected from the group consisting of maleimide, N-alkyl maleimides, N-aryl maleimides, N,N'-alkylene bis-maleimides, N,N'-arylene bis-maleimides, polymers of maleimide and substituted maleimides, and pyromellitic diimide.

3. the process of claim 2 wherein the equivalent ratio of bicyclic amide acetal to imide is in the range of from 0.8:1 to 1:1.2.

4. The process of claim 3 wherein the bicyclic amide acetal is one of Formula I in which R and R" are hydrogen and R' is methyl and the imide is maleimide.

5. The process of claim 3 wherein the bicyclic amide acetal is one of Formula I in which R is hydrogen R' is ethyl and R" is $CH_2OCH_2CH=CH_2$ and the imide is maleimide.

6. The process of claim 3 wherein the bicyclic amide acetal is one of Formula II wherein R is hydrogen, R' is ethyl and R''' is $C_4H_8$ and the imide is maleimide.

7. The process of claim 3 wherein the bicyclic amide acetal is one of Formula I in which R and R'' are hydrogen and R' is methyl and the imide is N-phenyl maleimide.

8. The process of claim 3 wherein the bicyclic amide acetal is one of Formula I wherein R is methyl, R' is $C_7H_{15}$ and R'' is $CH_2OCH_2CH=CH_2$ and the imide is maleimide.

9. The process of claim 3 wherein the bicyclic amide acetal is one of Formula I wherein R and R'' are hydrogen and R' is methyl and the imide is 4,4'-methylene bis(N-phenyl maleimide).

10. The process of claim 3 wherein the bicyclic amide acetal is one of Formula I wherein R and R'' are hydrogen and R' is phenyl and the imide is maleimide.

11. The process of claim 3 wherein the bicyclic amide acetal is one of Formula II wherein R is hydrogen, R' is ethyl and R''' is $C_4H_8$ and the imide is pyromellitic diimide.

12. The polymeric composition prepared by the process of claim 1.

* * * * *